March 18, 1952

J. T. SOLLER ET AL 2,589,883

SCHMIDT TYPE OPTICAL PROJECTION
SYSTEM FOR INDICATING DEVICES
Filed Nov. 29, 1945

INVENTORS
MERLE A. STARR
JOHN T. SOLLER

BY *M. O. Hayes*

ATTORNEY

Patented Mar. 18, 1952

2,589,883

UNITED STATES PATENT OFFICE 2,589,883

SCHMIDT TYPE OPTICAL PROJECTION SYSTEM FOR INDICATING DEVICES

John T. Soller and Merle A. Starr, Belmont, Mass., assignors, by mesne assignments, to the United States of America as represented by the Secretary of the Navy Application November 29, 1945, Serial No. 631,739

12 Claims. (Cl. 88—24)

This invention relates to an optical system for enlarging and projecting indications appearing upon the screen of a cathode ray tube onto a flat and conveniently horizontal surface in order that a direct plot of such indications may be easily made.

In the operation of radio echo detection systems it is frequently desirable to be able to plot the indications appearing upon the screen of the plan position indicator in order that a permanent record may be obtained thereof. This invention provides a novel projection system which greatly facilitates the plotting of such data.

An object of this invention is to provide a novel optical system for projecting indications appearing upon the screen of a cathode ray tube unto a convenient surface in order that a plot of such indications may be easily and conveniently made.

Another object of this invention is to provide an optical system by which the bearing of the vessel upon which the system is mounted, in relation to compass direction, may be superimposed upon the projected indications of a cathode ray tube.

A more particular object of this invention is to provide a novel optical system adapted to project the image appearing upon the screen of a dark trace cathode ray tube used in connection with radio echo detection apparatus on to a conveniently located surface so that indications appearing upon the screen of the cathode ray tube may be plotted.

Figure 1:
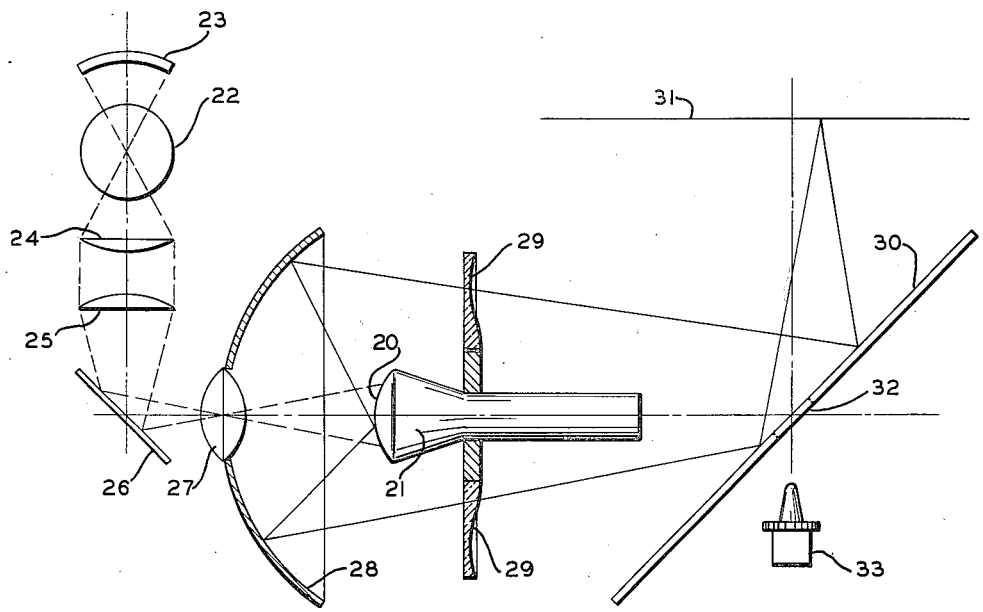
Figure 2:
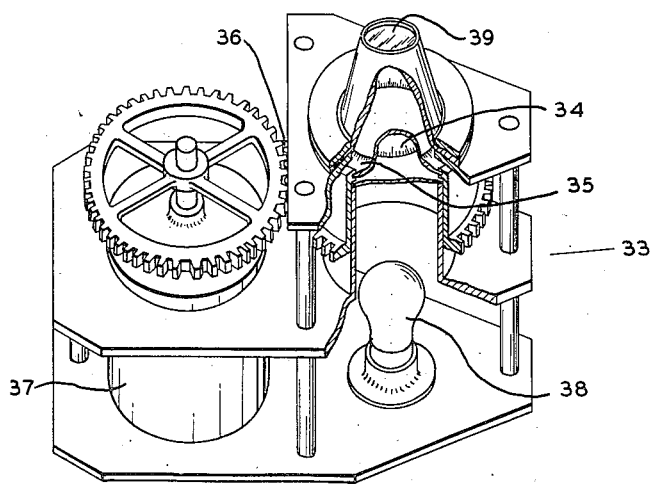

Further objects and advantages of this invention as well as its construction, arrangement, and operation, will be apparent from the following description and claims in connection with the accompanying drawing, in which, Fig. 1 is a schematic diagram of an optical system embodying the principles of this invention, and Fig. 2 is a side elevation, partly in section of a projector for superimposing the course of the vessel upon the projected image appearing upon the cathode ray tube.

Referring to the figures, there is shown schematically an optical system for projecting the indication appearing upon the screen 20 of a cathode ray tube 21 on to a conveniently located surface 31 which may be either a flashed and ground opal glass upon which the projected image may be traced directly or a clear glass over which tracing paper may be placed. The flashed and ground opal glass is preferred in that the diffusion offered by this glass is better than that of tracing paper.

Cathode ray tube 21 is preferably a Skiatron or dark trace tube having the face thereof ground in a spherical contour and having a special screen 20 which is normally white when unexcited, but which is darkened to a magenta color when struck by electrons. This darkness is a function of the strength of the signal received by the tube and the persistance of the darkening is in general longer than that of the phosphorescence of a luminescent cathode ray tube. Means for illuminating screen 20 of tube 21 consists of an external light source 22 provided with a suitable reflector 23 for directing light rays from source 22 through a pair of condenser lenses 24 and 25 to an inclined mirror 26 by which the light rays are directed to screen 20 through an image forming lens 27 mounted in the base of a spherical reflector 28. When screen 20 of tube 21 is placed at a point between the principal focus and center of curvature of reflector 28, an enlarged image of the brightly illuminated screen is formed on surface 31, the light rays being reflected by concave spherical mirror 28 through an annular correcting lens 29 on to a mirror 30 by which they are directed on to surface 31. Correcting lens 29 is provided to correct for any spherical aberration which may occur due to concave spherical reflector 28. By locating correcting lens 29 at the center of curvature of reflector 28 a minimum of correction is required. Light source 22 is preferably a mercury arc lamp capable of generating light of an intensity in the order of eight thousand to ten thousand foot candles, but it is to be understood that alternate light sources, such as, for example, an incandescent lamp may be used. In adjusting the system for focus the cathode ray tube axis and the reflector axis should coincide in order to prevent the projected image in some areas from appearing fuzzy or double. Likewise, it is necessary that the optical axes of reflector 28 and that of correction lens 29 coincide to assure a clear projection of the image appearing on surface 31.

A clear circular opening 32 in the center of mirror 30 permits placement underneath, of a ship's course projector 33 as shown in Fig. 2 whereby an image of two adjacent concentric annular scales 34 and 35 may be projected and superimposed onto surface 31. Both of these scales are calibrated in degrees, inner scale 34 being stationary while outer scale 35 is rotated through action of gear 36 by a selsyn 37 driven from the ship's gyroscopic compasses. Inner dial 34 may be set to indicate true north, while outer dial 35, being driven by the ship gyroscopic compass will indicate deviation of the vessel therefrom. A light source 38 preferably an incandescent lamp, is provided to illuminate the scales. The image is projected through circular opening 32 by lens 39.

While a particular arrangement of parts of the invention have been disclosed and described, it is to be understood that various changes and modifications may be made in this invention without departing from the spirit and scope thereof as set forth in the appended claims.

What is claimed is:

1. In combination with a cathode ray tube having a dark trace appearing on the screen thereof, an optical system for projecting an image of said trace upon a remote surface comprising, a light source, a concave reflector facing said screen, said reflector having an opening formed therein, means for directing and condensing light from said source on the surface of said screen through said opening in said concave reflector to provide projection illumination for said dark trace image, a correction lens surrounding said cathode ray tube, and a second reflector for directing light from said correction lens to said remote surfaces.

2. In combination with a cathode ray tube having a dark trace appearing upon the screen thereof, an optical system for projecting an image of said trace upon a remote surface comprising, a light source, means for directing and condensing light from said source upon the surface of said screen, a concave reflector disposed between said source and said screen and facing said screen, a correction lens disposed around said cathode ray tube and in the path of light from said concave reflector, a second reflector for directing light coming through said correction lens to said remote surface, a circular opening in said second reflector, and means disposed beneath said opening for superimposing an indication of graphical data upon said remote surface.

3. A system for presenting an indication on a remote surface of targets surrounding a vessel and their relation in azimuth to the vessel comprising, a light source, a dark trace cathode ray tube, means for condensing light from said source upon the screen of said cathode ray tube, a concave spherical mirror facing said screen, a correction lens surrounding said cathode ray tube and in the path of light reflected from said concave mirror, a plane reflector between said correction lens and said remote surface for reflecting light from said concave mirror, a centrally located circular opening in said plane reflector, and means disposed beneath said opening for superimposing the course of said vessel upon said remote surface.

4. A system for presenting an indication on a remote surface of targets surrounding a vessel and their relation in azimuth to the vessel comprising, a light source, a cathode ray tube having dark trace indications of targets surrounding said vessel displayed on the screen thereof, means for condensing light from said source on the surface of said screen, a concave reflector disposed between said light source and said cathode ray tube and facing the screen thereof, a circular opening in said concave reflector, a converging lens included as a part of said light condensing means disposed within said opening, a correction lens disposed about the neck of said cathode ray tube and in the path of light reflected from said concave reflector, a plane reflector having a centrally located circular opening therein, said plane reflector being disposed between said correction lens and said remote surface and reflecting light from said correction lens to said remote surface, and means disposed on the non-reflective side of said plane reflector and beneath said circular opening therein for providing an indication of azimuth of said targets on said remote surface.

5. In combination with a cathode ray tube having a dark trace screen, an optical system for projecting images upon a remote surface comprising, a light source, means for directing and condensing light from said source upon the surface of said screen, a concave reflector disposed between said source and said screen and facing said screen, a correction lens disposed around said cathode ray tube and in the path of light from said concave reflector, a second reflector for directing light coming through said correction lens to said remote surface, an opening in said second reflector and means for superimposing additional images upon said surface through said opening.

6. In combination with a cathode ray tube having a dark trace screen, an optical system for projecting dark trace images formed on said screen upon a remote surface comprising, a concave reflector facing said screen, said reflector having a central opening formed therein, a correction lens surrounding said cathode ray tube, a second reflector for directing light from said correction lens to said remote surface, means for providing projection illumination for said dark trace images comprising a light source and means for directing light from said source through the central opening in said concave reflector onto said screen, and means for projecting additional images through said second reflector onto said remote surface.

7. In combination with a cathode ray tube having a dark trace screen, an optical system for projecting images upon a remote surface comprising, a light source, a concave reflector facing said screen, said reflector having an opening formed therein, means for directing and condensing light from said source on the surface of said screen through said opening in said concave reflector, a correction lens surrounding said cathode ray tube, a second reflector for directing light from said correction lens to said remote surface, said second reflector having an opening formed therein and means adjacent said opening for superimposing additional images upon said remote surface through said opening.

8. A system for projecting onto a remote screen an enlarged replica of an image formed on a spherical surface and visible only by reflected light comprising, a concave reflector having a central opening therein, a correction lens having a central opening therein, means supporting said spherical surface between the principal focus and center of curvature of said reflector intermediate said reflector and said correction lens and coaxially therewith, and means for providing projection illumination for said image comprising a light source and means for directing light from said source through the central opening in said concave reflector onto said spherical surface for brightly and uniformly illuminating said image.

9. In combination, a cathode ray tube having a screen visible only by reflected light on which an image is produced as dark lines in response to the impingement thereon of the electron beam of said tube; an optical system for projecting an enlarged replica of said image on a remote surface comprising, a concave reflector having a central opening therein facing said screen, a correction lens surrounding said cathode ray tube, and a second reflector for directing light from said correction lens to said remote surface; and means for brightly illuminating the screen of said cathode ray tube to provide projection illumination for said image comprising a light source and means for directing light from said source through the central opening in said concave reflector onto the screen of said cathode ray tube.

10. In combination, a cathode ray tube having a spherical screen visible only by reflected light on which a dark image is produced in response to the impingement thereon of the electron beam of said tube; an optical system for projecting an enlarged replica of said image on a remote surface comprising a concave reflector having a central opening therein and facing said screen, said screen being positioned between the principal focus and center of curvature of said reflector, a correction lens surrounding said cathode ray tube, and a second reflector for directing light from said correction lens to said remote surface; and means for providing projection illumination for said image comprising a light source and means for directing light from said source through the central opening in said concave reflector onto said screen for brightly and uniformly illuminating said image.

11. In combination with a Schmidt optical system including a concave reflector and a correction lens having a central opening therein, a cathode ray tube having a screen visible only by reflected light on which an image is produced as dark lines upon impingement of the electron beam of said tube, said cathode ray tube being positioned in the central opening of said correction lens with the screen thereof facing said concave reflector, and means for brightly illuminating the screen of said cathode ray tube to provide projection illumination for said image comprising a light source and means for directing light from said source through a central opening in said concave reflector onto the screen of said cathode ray tube.

12. In combination, a cathode ray tube having a spherical screen visible only by reflected light on which a dark image is produced in response to the impingement thereon of the electron beam of said tube; an optical system for projecting an enlarged replica of said image on a remote surface comprising a concave reflector having a central opening therein facing said screen, said screen being positioned between the principal focus and center of curvature of said reflector, a correction lens surrounding said cathode ray tube, and a second reflector for directing light from said correction lens to said remote surface; means for providing projection illumination for said image comprising a light source and means for directing light from said source through the central opening in said concave reflector onto said screen for brightly and uniformly illuminating said image; and means for superimposing additional images with said replica on said surface comprising an opening in said second reflector and means disposed beneath said opening and arranged to project said additional images through said opening onto said remote surface.

JOHN T. SOLLER.
MERLE A. STARR.

REFERENCES CITED

The following references are of record in the file of this patent:

UNITED STATES PATENTS

| Number | Name | Date |
|---|---|---|
| 1,215,425 | Sperry | Feb. 13, 1917 |
| 2,061,378 | Henze et al. | Nov. 17, 1936 |
| 2,155,248 | Adams et al. | Apr. 18, 1939 |
| 2,251,984 | Cleaver et al. | Aug. 12, 1941 |
| 2,273,801 | Landis | Feb. 17, 1942 |
| 2,295,779 | Epstein | Sept. 15, 1942 |
| 2,297,443 | Von Ardene | Sept. 29, 1942 |
| 2,306,407 | Rosenthal | Dec. 29, 1942 |
| 2,316,550 | Bigalke | Apr. 13, 1943 |
| 2,404,943 | Beshgetoor | July 30, 1946 |